US011140900B2

(12) United States Patent
Becher

(10) Patent No.: US 11,140,900 B2
(45) Date of Patent: Oct. 12, 2021

(54) AQUEOUS HERBICIDAL CONCENTRATES

(71) Applicant: Monsanto Technology LLC, St. Louis, MO (US)

(72) Inventor: David Z. Becher, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 14/606,137

(22) Filed: Jan. 27, 2015

(65) Prior Publication Data

US 2015/0208653 A1    Jul. 30, 2015

Related U.S. Application Data

(60) Provisional application No. 61/932,199, filed on Jan. 27, 2014.

(51) Int. Cl.
*A01N 41/06* (2006.01)
*A01N 25/04* (2006.01)
*A01N 25/28* (2006.01)

(52) U.S. Cl.
CPC ............. *A01N 41/06* (2013.01); *A01N 25/04* (2013.01); *A01N 25/28* (2013.01)

(58) Field of Classification Search
CPC ......... A01N 41/06; A01N 25/04; A01N 25/28
See application file for complete search history.

(56) References Cited

U.S. PATENT DOCUMENTS

| | | | |
|---|---|---|---|
| 3,516,846 A | 6/1970 | Matson | |
| 3,516,941 A | 6/1970 | Matson | |
| 3,959,464 A | 5/1976 | Desavigny | |
| 4,021,224 A | 5/1977 | Pallos et al. | |
| 4,107,292 A | 8/1978 | Nemeth | |
| 4,193,889 A | 3/1980 | Baatz et al. | |
| 4,280,833 A | 7/1981 | Beestman et al. | |
| 4,285,720 A | 8/1981 | Scher | |
| 4,356,108 A | 10/1982 | Schwab et al. | |
| 4,417,916 A | 11/1983 | Beestman et al. | |
| 4,428,983 A | 1/1984 | Nehen et al. | |
| 4,480,082 A | 10/1984 | McLean et al. | |
| 4,489,017 A | 12/1984 | Alberts et al. | |
| 4,563,212 A | 1/1986 | Becher et al. | |
| 4,599,271 A | 7/1986 | Chao | |
| 4,640,709 A | 2/1987 | Beestman | |
| 4,643,764 A | 2/1987 | Scher | |
| 4,668,580 A | 5/1987 | Dahm et al. | |
| 4,670,246 A | 6/1987 | Dahl | |
| 4,681,806 A | 7/1987 | Matkan et al. | |
| 4,738,898 A | 4/1988 | Vivant | |
| 4,847,152 A | 7/1989 | Jabs et al. | |
| 4,859,788 A | 8/1989 | Brindopke et al. | |
| 4,889,719 A | 12/1989 | Ohtsubo et al. | |
| 4,936,901 A | 6/1990 | Surgant, Sr. et al. | |
| 4,938,797 A | 7/1990 | Hasslin et al. | |
| 4,956,129 A | 9/1990 | Scher et al. | |
| 5,006,161 A | 4/1991 | Hasslin et al. | |
| 5,049,182 A | 9/1991 | Scher et al. | |
| 5,223,477 A | 6/1993 | Scher et al. | |
| 5,310,721 A | 5/1994 | Lo | |
| 5,342,556 A | 8/1994 | Traubel et al. | |
| 5,354,742 A | 10/1994 | Deming et al. | |
| 5,461,027 A | 10/1995 | Bergman | |
| 5,583,090 A | 12/1996 | Stern et al. | |
| 5,686,384 A | 11/1997 | Hester | |
| 5,783,520 A | 7/1998 | Anderson et al. | |
| 5,925,464 A | 7/1999 | Mulqueen et al. | |
| 5,925,595 A | 7/1999 | Seitz et al. | |
| 6,020,066 A | 2/2000 | Weisser et al. | |
| 6,133,197 A | 10/2000 | Chen et al. | |
| 6,165,939 A | 12/2000 | Agbaje et al. | |
| 6,337,130 B1 | 1/2002 | Van Koppenhagen et al. | |
| 6,340,653 B1 | 1/2002 | Scher et al. | |
| 6,455,469 B1 | 9/2002 | Crosby et al. | |
| 6,485,736 B1 | 11/2002 | Shirley et al. | |
| 6,566,306 B1 | 5/2003 | Wolf et al. | |
| 6,653,256 B1 | 11/2003 | Wolf et al. | |
| 6,730,635 B2 | 5/2004 | Wolf et al. | |
| 6,992,047 B2 | 1/2006 | Asrar et al. | |
| 7,056,522 B2 | 6/2006 | Voris et al. | |
| 7,199,185 B2 | 4/2007 | Heming et al. | |
| 7,381,861 B2 | 6/2008 | Cerny et al. | |
| 7,687,434 B2 | 3/2010 | De Billot et al. | |
| 7,718,572 B2 | 5/2010 | Igari et al. | |
| 7,754,655 B2 | 7/2010 | Wolf et al. | |

(Continued)

FOREIGN PATENT DOCUMENTS

EP    0008207 A2    2/1980
EP    0148149 A2    7/1985

(Continued)

OTHER PUBLICATIONS

Reflex Herbicide Label, Label Amendment, 2011, United States Environmental Protection Agency, pp. 1-43. (Year: 2011).*
Parker, D.C., et al., "Fall and Early Preplant Application Timing Effects on Persistence and Efficacy of Acetamide Herbicides," 2005, Weed Technology, 19:6-13.
Scher, H.B., et al., "Microencapsulation of Pesticides by Interfacial Polymerization Utilizing Isocyanate or Aminoplast Chemistry," 1998, Pesti Sci, 54/4:394-400, XP-000804298.
Wilson, R., "Chapter 20: Encapsulated Acetochlor for Selective Weed Control in Roundup-Ready Sugarbeets,", 2010, 2009 Weed Control Report, http://panhandle.unl.edu/c/document_library/get_file?uuid+a97205bc-1618-4ffc-ac2d-45bf5ee801b5&groupId=131817, 3 pages.
Agnique NCS 11NP, Cognis, Functional Products, Sep. 3, 2009, 2 pages.

(Continued)

*Primary Examiner* — Sue X Liu
*Assistant Examiner* — Andriae M Holt
(74) *Attorney, Agent, or Firm* — Stinson LLP

(57) ABSTRACT

Herbicidal concentrate compositions containing a combination of herbicides are provided. In particular, the present invention relates to aqueous herbicidal concentrate compositions containing a particulate encapsulated acetanilide herbicide and a protoporphyrinogen oxidase inhibitor (PPO inhibitor).

21 Claims, No Drawings

(56) References Cited

U.S. PATENT DOCUMENTS

| | | |
|---|---|---|
| 2002/0004457 A1 | 1/2002 | Nevill et al. |
| 2003/0022791 A1 | 1/2003 | Asrar et al. |
| 2004/0137031 A1 | 7/2004 | Seitz et al. |
| 2005/0208089 A1 | 9/2005 | Asrar et al. |
| 2005/0233907 A1 | 10/2005 | Nabors et al. |
| 2005/0277549 A1 | 12/2005 | Seitz et al. |
| 2008/0242548 A1 | 10/2008 | Asrar et al. |
| 2009/0105077 A1 | 4/2009 | Bhatti et al. |
| 2010/0248963 A1 | 9/2010 | Becher et al. |
| 2012/0129694 A1 | 5/2012 | Ditmarsen et al. |
| 2013/0029847 A1 | 1/2013 | Findley et al. |
| 2013/0109569 A1 | 5/2013 | Dave et al. |
| 2013/0252812 A1 | 9/2013 | Shao et al. |

FOREIGN PATENT DOCUMENTS

| | | |
|---|---|---|
| EP | 0252896 A2 | 1/1988 |
| EP | 0369614 A2 | 5/1990 |
| EP | 0679333 A2 | 11/1995 |
| EP | 0780154 A1 | 6/1997 |
| WO | 81/02505 A1 | 9/1981 |
| WO | 92/13450 A1 | 8/1992 |
| WO | 00/05951 A1 | 2/2000 |
| WO | 00/05952 A1 | 2/2000 |
| WO | 01/10414 A1 | 2/2001 |
| WO | 01/94001 A2 | 12/2001 |
| WO | 01/96010 A1 | 12/2001 |
| WO | 02/082901 A1 | 10/2002 |
| WO | 2005/012488 A2 | 2/2005 |
| WO | 2005/122759 A1 | 12/2005 |
| WO | 2009/103455 A2 | 8/2009 |
| WO | 2010/093970 A3 | 8/2010 |
| WO | 2013/134310 A1 | 12/2013 |

OTHER PUBLICATIONS

"Best Choice Guidelines for the Consumer Products Industry", CP Kelco U.S., Inc., 2012, 20 pages.

2010 Research Progress Report, Mar. 8-11, Western Society of Weed Science, Waikoloa, Hawaii, http://www.wsweedscience.org/Research Report Archive/2010 WSWS RPR.pdf, 146 pages.

Microencapsulation Technology and Future Trends, Stern et al., 1996, Ch 7, pp. 93-114.

Prefix Herbicide, Syngenta, Product Label, EPA Reg. No. 100-1268, 2010, 24 pages.

International Search Report dated Apr. 15, 2015 in related PCT/US2015/012988, 4 pages.

\* cited by examiner

AQUEOUS HERBICIDAL CONCENTRATES

REFERENCE TO RELATED APPLICATIONS

This application claims benefit of U.S. provisional application Ser. No. 61/932,199, filed Jan. 27, 2014, the entire disclosure of which is incorporated herein by reference.

FIELD OF THE INVENTION

The present invention generally relates to herbicidal concentrate compositions containing a combination of herbicides. In particular, the present invention relates to aqueous herbicidal concentrate compositions containing a particulate encapsulated acetanilide herbicide and a protoporphyrinogen oxidase inhibitor (PPO inhibitor).

BACKGROUND OF THE INVENTION

The emergence of certain herbicide resistant weeds has generated interest in developing strategies to supplement the action of primary herbicides such as glyphosate. Acetanilides herbicides are known as effective residual control herbicides that reduce early season weed competition. In particular, acetanilide herbicides such as acetochlor provide outstanding residual control of many grasses and broadleaf weeds including pigweed, waterhemp, lambsquarters, nightshade, foxtails, among others. Acetanilides are generally classified as seedling growth inhibitors. Seedling growth inhibitors are absorbed and translocated in plants from germination to emergence primarily by subsurface emerging shoots and/or seedling roots. Acetanilide herbicides typically do not offer significant post-emergence activity, but as a residual herbicide provide control of newly emerging monocots and small-seeded dicot weed species. This supplements the activity of post-emergent herbicides that lack significant residual activity.

Crop injury caused by application of acetanilide herbicides necessitated strategies to reduce this effect. One strategy involved applying the acetanilide herbicide formulations after the emergence of the crop (i.e., post-emergent to the crop), but before the emergence of later germinating weeds (i.e., pre-emergent to the weeds). However, application during this time window may cause foliar injury to the crop. Other strategies to reduce crop injury involved microencapsulating the acetanilide herbicide. Methods for producing microencapsulated acetanilides are described in various patents and publications including U.S. Pat. No. 5,925,595; U.S. Publication No. 2004/0137031; and U.S. Publication No. 2010/0248963.

Another class of herbicides that have effective residual control and activity against persistent herbicide resistant weeds such as palmer amaranth (*Amaranthus palmeri*) include protoporphyrinogen oxidase (PPO) inhibitors. PPO inhibitors include herbicides such as acifluorfen, azafenidin, bifenox, butafenacil, carfentrazone-ethyl, flufenpyr-ethyl, flumiclorac, flumiclorac-pentyl, flumioxazin, fluoroglycofen, fluthiacet-methyl, fomesafen, lactofen, oxadiargyl, oxadiazon, oxyfluorfen, pyraflufen-ethyl, saflufenacil and sulfentrazone, salts and esters thereof, and mixtures thereof.

Herbicide compositions containing a combination of herbicides with multiple modes of action and that can supplement the action of primary herbicides such as glyphosate are especially suited for controlling growth of unwanted plants, including those with selected herbicide resistance.

Dilute tank mix compositions of encapsulated acetanilide herbicides and PPO inhibitors are known in the art. However, the mixes are typically prepared at the point of use by the end user. There remains a need for highly concentrated herbicidal compositions containing encapsulated acetanilide herbicides and PPO inhibitors that are convenient for agricultural workers to formulate as spray solutions and that avoid the risk of tank mixing errors.

Further, the stability of herbicidal concentrates of encapsulated acetanilides are sensitive to the inclusion of further additives including co-herbicides. Accordingly, there remains a need for highly concentrated herbicidal compositions containing encapsulated acetanilide herbicides and PPO inhibitors that can be economically produced while having sufficient stability and that can be diluted to provide effective spray formulation solutions for application to unwanted plants.

SUMMARY OF THE INVENTION

In one aspect, the present invention is directed to an aqueous herbicidal concentrate composition comprising:

microcapsules comprising an acetanilide herbicide, wherein the acetanilide herbicide concentration in the composition on an active ingredient basis is at least about 25 wt. %;

a water-soluble protoporphyrinogen oxidase inhibitor (PPO inhibitor); and at least about 750 ppm of a pseudoplastic thickener based on the total weight of the composition.

In another aspect, the present invention is directed to an aqueous herbicidal concentrate composition comprising:

microcapsules comprising an acetanilide herbicide, wherein the acetanilide herbicide concentration in the composition on an active ingredient basis is at least about 25 wt. %;

a water-soluble protoporphyrinogen oxidase inhibitor (PPO inhibitor);

a structure-breaking agent in a concentration of not more than about 3.5 wt. %; and a density adjusting agent, wherein the total concentration of structure-breaking agent and density adjusting agent is from about 7 wt. % to about 10 wt. %, from about 7.5 wt. % to about 9 wt. %, or from about 8 wt. % to about 9 wt. %.

In a further aspect, the present invention is directed to an aqueous herbicidal concentrate composition comprising:

microcapsules comprising an acetanilide herbicide, wherein the acetanilide herbicide concentration in the composition on an active ingredient basis is at least about 25 wt. %;

a water-soluble protoporphyrinogen oxidase inhibitor (PPO inhibitor);

at least about 750 ppm of a pseudoplastic thickener based on the total weight of the composition;

a structure-breaking agent in a concentration of not more than about 3.5 wt. %; and a density adjusting agent, wherein the total concentration of structure-breaking agent and density adjusting agent is from about 7 wt. % to about 10 wt. %, from about 7.5 wt. % to about 9 wt. %, or from about 8 wt. % to about 9 wt. %.

In still another aspect, the present invention is directed to an aqueous herbicidal concentrate composition comprising:

microcapsules comprising a core material comprising an acetanilide herbicide and a shell wall material encapsulating the core material;

an aqueous phase comprising the acetanilide herbicide (unencapsulated acetanilide) and a water-soluble protoporphyrinogen oxidase inhibitor (PPO inhibitor), wherein the total acetanilide herbicide concentration in the composition on an active ingredient basis is at least about 25 wt. %; the weight ratio of total acetanilide herbicide to PPO inhibitor is from about 1:10 to 10:1; and the concentration of the acetanilide herbicide in the aqueous phase is from about 0.5% to about 10% of the total weight of acetanilide herbicide.

Other objects and features will be in part apparent and in part pointed out hereinafter.

DESCRIPTION OF THE PREFERRED EMBODIMENTS

Generally, the present invention is directed to aqueous herbicidal concentrate compositions comprising a combination of at least one encapsulated acetanilide herbicide and at least one PPO inhibitor herbicide.

One aspect of the present invention is to provide a highly concentrated herbicidal composition containing at least one encapsulated acetanilide herbicide and at least one PPO inhibitor that can be diluted to provide an effective spray formulation solution. A highly concentrated composition reduces the volume of the liquid and associated packaging that would otherwise be required for more dilute compositions. The smaller volume reduces space required to store and transport the concentrate composition prior to sale or use. Further, a highly concentrated herbicidal composition containing both an acetanilide herbicide and PPO inhibitor is convenient for agricultural workers to formulate as spray solutions and avoids the risk of tank mixing errors.

Another aspect of the present invention is to provide a highly concentrated herbicidal composition containing both an encapsulated acetanilide herbicide and PPO inhibitor that is stable and does not appreciably separate into phases, form precipitates, or gel upon standing or storage. A stable and compatible highly concentrated herbicidal composition beneficially provides a uniform spray formulation solution upon dilution without the need for excessive agitation.

In accordance with the present invention, the concentrate compositions comprise a PPO inhibitor. PPO inhibitors include herbicides such as acifluorfen, azafenidin, bifenox, butafenacil, carfentrazone-ethyl, flufenpyr-ethyl, flumiclorac, flumiclorac-pentyl, flumioxazin, fluoroglycofen, fluthiacet-methyl, fomesafen, lactofen, oxadiargyl, oxadiazon, oxyfluorfen, pyraflufen-ethyl, saflufenacil and sulfentrazone, salts and esters thereof, and mixtures thereof. Some PPO inhibitor herbicides are available in their free forms, as salts, or as derivatized materials, for example, as esters. In various embodiments, the concentrate compositions comprise a water-soluble PPO inhibitor. In some embodiments, the water-soluble PPO inhibitor is selected from the group consisting of water-soluble salts of fomesafen and acifluorfen. In certain embodiments, the water-soluble PPO inhibitor is selected from the group consisting of sodium fomesafen and sodium acifluorfen. In still further embodiments, the water-soluble PPO inhibitor comprises sodium fomesafen.

Typically, the aqueous herbicidal concentrate compositions of the present invention contain at least about 2 wt. %, at least about 4 wt. %, at least about 5 wt. %, at least about 6 wt. %, or at least about 8 wt. % of the PPO inhibitor on an active ingredient basis. In these and other embodiments, the aqueous herbicidal concentrate compositions contain from about 2 wt. % to about 20 wt. %, from about 4 wt. % to about 20 wt. %, from about 5 wt. % to about 20 wt. %, from about 5 wt. % to about 15 wt. %, from about 5 wt. % to about 10 wt. %, from about 6 wt. % to about 15 wt. %, or from about 6 wt. % to about 10 wt. % of the PPO inhibitor on an active ingredient basis.

The concentrate compositions also comprise an encapsulated acetanilide herbicide (e.g., microcapsules of acetanilide herbicides). Acetanilide herbicides include herbicides such as acetochlor, alachlor, butachlor, butenachlor, delachlor, diethatyl, dimethachlor, mefenacet, metazochlor, metolachlor, S-metolachlor, pretilachlor, propachlor, propisochlor, prynachlor, terbuchlor, thenylchlor and xylachlor, mixtures thereof and stereoisomers thereof. Some acetanilide herbicides are available in their free forms, as salts, or as derivatized materials, for example, as esters. In various embodiments, the acetanilide herbicide is selected from the group consisting of acetochlor, alachlor, butachlor, metolachlor, and S-metolachlor. In certain embodiments, the acetanilide herbicide is selected from the group consisting of acetochlor, metolachlor and S-metolachlor. In various embodiments, the acetanilide herbicide comprises acetochlor.

The aqueous herbicidal concentrate compositions of the present invention contain at least about 15 wt. %, at least about 20 wt. %, at least about 25 wt. %, at least about 30 wt. %, or at least about 35 wt. % of the acetanilide herbicide on an active ingredient basis. In these and other embodiments, the aqueous herbicidal concentrate compositions contain from about 15 wt. % to about 40 wt. %, from about 20 wt. % to about 40 wt. %, from about 20 wt. % to about 35 wt. %, from about 20 wt. % to about 30 wt. %, from about 25 wt. % to about 40 wt. %, from about 25 wt. % to about 35 wt. %, from about 30 wt. % to about 40 wt. %, or from about 30 wt. % to about 35 wt. % of the acetanilide herbicide on an active ingredient basis.

The weight ratio of total acetanilide herbicide to PPO inhibitor on an acid equivalence (a.e.) basis can be from about 1:10 to about 10:1, from about 1:8 to about 8:1, from about 1:6 to about 6:1. In various embodiments, the weight of the acetanilide herbicide is greater than the weight of the PPO inhibitor. Thus, the weight ratio of total acetanilide herbicide to PPO inhibitor on an acid equivalence basis can be from about 2:1 to about 10:1, from about 2:1 to about 8:1, from about 3:1 to about 10:1, from about 3:1 to about 8:1, from about 4:1 to about 10:1, from about 4:1 to about 8:1, from about 5:1 to about 10:1, or from about 5:1 to about 8:1.

In general, at least a portion of the acetanilide herbicide component of the concentrate compositions of the present invention is encapsulated (e.g., in microcapsules). The encapsulated acetanilide herbicides for use in the present invention may be prepared by contacting an aqueous continuous phase containing a polyamine component comprising a polyamine source and a discontinuous oil phase containing the acetanilide herbicide and a polyisocyanate component comprising a polyisocyanate source. A polyurea shell wall is formed in a polymerization reaction between the polyamine source and the isocyanate source at the oil/water interface thereby forming a capsule or microcapsule containing the acetanilide herbicide. Accordingly, the microcapsules comprising the acetanilide herbicide can comprise a polyurea shell wall.

The polyurea polymer shell wall of the microcapsules may be formed using one or more polyisocyanates, i.e., having two or more isocyanate groups per molecule. In some embodiments, the polyurea shell wall is formed using a blend of at least two polyisocyanates. For example, the polyurea shell wall is formed in an interfacial polymerization reaction using at least one diisocyanate and at least one triisocyanate. A variety of polyisocyanates can be employed.

For example, the polyisocyanate component can comprise an aliphatic polyisocyanate such those based on hexamethylene diisocyanate (e.g., DESMODUR N 3200 and DESMODUR N 3215).

The polyamine source can be a single polyamine species or a mixture of two or more different polyamine species. In some embodiments of the present invention, the polyamine source consists essentially of a principal polyamine. As used herein, a principal polyamine refers to a polyamine consisting essentially of a single polyamine species. The polyisocyanate source can also be a single polyisocyanate species or a mixture of two or more different polyisocyanate species. See, for example, U.S. Pat. No. 5,925,595; U.S. Publication No. 2004/0137031; and U.S. Publication No. 2010/0248963, which are incorporated herein by reference.

In general, an aqueous dispersion of the acetanilide capsules or microcapsules may be produced by an interfacial polymerization reaction, either continuously or batchwise, using means known in the art. However, preferably a polyamine is polymerized with one or more polyisocyanates at the interface of an oil-in-water emulsion. The discontinuous oil phase (also referred to herein as "internal phase") preferably comprises one or more polyisocyanates and a continuous aqueous phase (also referred to herein as "external phase") comprises the principal amine. The oil phase further comprises a core material that comprises the acetanilide herbicide as the active ingredient.

The oil-in-water emulsion is preferably formed by adding the oil phase to the continuous aqueous phase to which an emulsifying agent or dispersant has been added (e.g., previously dissolved therein). The emulsifying agent is selected to achieve the desired oil droplet size in the emulsion. The size of the oil droplets in the emulsion is impacted by a number of factors in addition to the emulsifying agent employed and determines the size of microcapsules formed by the process. The emulsifying agent is preferably a protective colloid. Polymeric dispersants are preferred as protective colloids. Polymeric dispersants provide steric stabilization to an emulsion by adsorbing to the surface of an oil drop and forming a high viscosity layer which prevents drops from coalescing. Polymeric dispersants may be surfactants and are preferred to surfactants which are not polymeric, because polymeric compounds form a stronger interfacial film around the oil drops. If the protective colloid is ionic, the layer formed around each oil drop will also serve to electrostatically prevent drops from coalescing. SOKALAN (available from BASF), a maleic acid-olefin copolymer, is a preferred protective colloid, as is INVALON (available from Huntsman) and AGNIQUE NSC 11NP (available from BASF), which are naphthalene sulfonate condensates.

Other protective colloids useful in this invention are gelatin, casein, polyvinyl alcohol, alkylated polyvinyl pyrrolidone polymers, maleic anhydride-methyl vinyl ether copolymers, styrene-maleic anhydride copolymers, maleic acid-butadiene and diisobutylene copolymers, sodium and calcium lignosulfonates, sulfonated naphthalene-formaldehyde condensates, modified starches, and modified cellulosics like hydroxyethyl or hydroxypropyl cellulose, and carboxymethyl cellulose.

It is advantageous to select a polyamine component and a polyisocyanate component such that the polyamine has an amine functionality of at least 2, i.e., 3, 4, 5 or more, and at least one of the polyisocyanates has an isocyanate functionality of at least 2, i.e., 2.5, 3, 4, 5, or more since high amine and isocyanate functionality increases the percentage of cross-linking occurring between individual polyurea polymers that comprise the shell wall. In some embodiments, the polyamine has an amine functionality of greater than 2 and the polyisocyanate is a mixture of polyisocyanates wherein each polyisocyanate has an isocyanate functionality of greater than 2. In other embodiments, the polyamine comprises a trifunctional polyamine and the polyisocyanate component comprises one or more trifunctional polyisocyanates. In yet other embodiments, the shell wall is formed by the reaction between a polyisocyanate or mixture of polyisocyanates with a minimum average of 2.5 reactive groups per molecule and a polyamine with an average of at least three reactive groups per molecule. It is, moreover, advantageous to select concentrations of the polyamine component and the polyisocyanate component such that the polyisocyanate component is substantially completely reacted to form the polyurea polymer. Complete reaction of the polyisocyanate component increases the percentage of cross-linking between polyurea polymers formed in the reaction thereby providing structural stability to the shell wall. These factors, i.e., the ratio of weight of core material components compared to weight of shell wall components, the mean particle sizes of the herbicidal microcapsules, the degree of crosslinking, among other factors, may be selected to affect the release rate profile of the population of herbicidal microcapsules, thereby enabling the preparation of herbicidal microcapsules that balance enhanced crop safety and are still efficacious for weed control.

The microencapsulated acetanilide can be prepared by the methods described in U.S. Publication No. 2010/0248963. In particular, the method includes encapsulating core material comprising the acetanilide herbicide in a shell wall formed by reacting a polyamine component and a polyisocyanate component in a reaction medium in concentrations such that the reaction medium comprises a molar equivalent excess of amine groups compared to the isocyanate groups. That is, the molar equivalents ratio of amine equivalents to isocyanate equivalents used in preparation of the shell wall of the microcapsules is greater than 1:1. For example, a molar equivalents ratio at least 1.01:1, or at least about 1.05:1 is used to ensure that the isocyanate is completely reacted. The ratio of amine molar equivalents contained in the polyamine component to isocyanate molar equivalents contained in the polyisocyanate component can be from 1.01:1 to about 1.7:1, from 1.01:1 to about 1.6:1, from 1.01:1 to about 1.5:1, from 1.01:1 to about 1.4:1, from 1.01:1 to about 1.3:1, from 1.05:1 to about 1.7:1, from 1.05:1 to about 1.6:1, from 1.05:1 to about 1.5:1, from 1.05:1 to about 1.4:1, or from 1.05:1 to about 1.3:1.

The molar equivalents ratio of amine molar equivalents to isocyanate molar equivalents is calculated according to the following equation:

$$\text{Molar Equivalents Ratio} = \frac{\text{amine molar equivalents}}{\text{isocyanate molar equivalents}} \quad (1)$$

In the above equation (1), the amine molar equivalents is calculated according to the following equation:

molar equivalents=Σ(polyamine weight/equivalent weight).

In the above equation (1), the isocyanate molar equivalents is calculated according to the following equation:

isocyanate molar equivalents=Σ(polyisocyanate weight/equivalent weight).

The equivalent weight is generally calculated by dividing the molecular weight in grams/mole by the number of functional groups per molecules. For some molecules, such as triethylenetetramine ("TETA") and 4,4'-diisocyanato-dicyclohexyl methane ("DES W"), the equivalent weight is equal to the molecular weight divided by the number of functional groups per molecule. For example, TETA has a molecular weight of 146.23 g/mole and 4 amine groups. Therefore, the equivalent weight is 36.6 g/mol. This calculation is generally correct, but for some materials, the actual equivalent weight may vary from the calculated equivalent weight. In some components, for example, the biuret-containing adduct (i.e., trimer) of hexamethylene-1,6-diisocyanate, the equivalent weight of the commercially available material differs from the theoretical equivalent weight due to, for example, incomplete reaction. The theoretical equivalent weight of the biuret-containing adduct (i.e., trimer) of hexamethylene-1,6-diisocyanate is 159.5 g/mol. The actual equivalent weight of the trimer of hexamethylene-1,6-diisocyanate ("DES N3200"), the commercially available product, is about 183 g/mol. This actual equivalent weight is used in the calculations above. The actual equivalent weight may be obtained from the manufacturer or by titration with a suitable reactant by methods known in the art. The symbol, $\Sigma$, in the amine molar equivalents calculation means that the amine molar equivalents comprises the sum of amine molar equivalents for all polyamines in the reaction medium. Likewise, the symbol, $\Sigma$, in the isocyanate molar equivalents calculation means that the isocyanate molar equivalents comprises the sum of isocyanate molar equivalents for all polyisocyanates in the reaction medium.

As reported in U.S. Publication No. 2010/0248963, it is believed, without being bound to any particular theory, that the combination of increased particle size and the shell characteristics resulting from a large excess of unreacted amine groups significantly reduces the release rate, which is in that case the amount of herbicide that the crop plants are exposed to following application, thereby providing enhanced crop safety and minimized crop plant injury. It is believed, without being bound to any particular theory, that increased excess of amine groups results in a significant number of unreacted amine functional groups thereby providing a shell having a large number of amine functional groups that are not cross-linked. It is believed that the resulting shell wall is flexible and resistant to rupturing such that the amount of herbicide that crop plants are initially exposed to upon application of a herbicidal formulation containing the microcapsules is reduced. It is further believed that unreacted amine groups may reduce the number of fissures or cracks in the shell wall thereby reducing leakage and flow of herbicide through the shell wall from the core.

Accordingly, in various embodiments, the molar concentration of amine groups from the polyamine component and the molar concentration of isocyanate groups from the at least one polyisocyanate (i.e., one polyisocyanate, a blend of two polyisocyanates, a blend of three polyisocyanates, etc.) in the reaction medium is such that the ratio of the concentration of amine molar equivalents to the concentration of isocyanate molar equivalents is at least about 1.1:1. In various embodiments, the molar equivalents ratio of amine molar equivalents to isocyanate molar equivalents can be at least about 1.15:1, or even at least about 1.20:1. In some embodiments, the molar equivalents ratio is less than about 1.7:1, less than about 1.6:1, less than about 1.5:1, less than about 1.4:1, or even less than about 1.3:1. In various embodiments, the molar equivalents ratio of amine molar equivalents to isocyanate molar equivalents in the polymerization medium is from 1.1:1 to about 1.7:1, from 1.1:1 to about 1.6:1, from 1.1:1 to about 1.5:1, from 1.1:1 to about 1.4:1, from 1.1:1 to about 1.3:1, from about 1.15:1 to about 1.7:1, from about 1.15:1 to about 1.6:1, from about 1.15:1 to about 1.5:1, from about 1.15:1 to about 1.4:1, from about 1.15:1 to about 1.3:1, from 1.2:1 to about 1.7:1, from 1.2:1 to about 1.6:1, from 1.2:1 to about 1.5:1, from 1.2:1 to about 1.4:1, or from 1.2:1 to about 1.3:1. Examples of typical ratios include 1.1:1, 1.15:1, 1.2:1, 1.25:1, 1.3:1, 1.35:1, 1.4:1, 1.45:1 and 1.5:1.

Generally, the microcapsules can be characterized as having a mean particle size of at least about 2, 3, 4, 5, 6, 7, 8, 9 or 10 µm. For example, the microcapsules have a mean particle size range of from about 2 µm to about 15 µm, from about 2 µm to about 12 µm, or from about 6 µm to about 15 µm. The capsules or microcapsules are essentially spherical such that the mean transverse dimension defined by any point on a surface of the microcapsule to a point on the opposite side of the microcapsule is essentially the diameter of the microcapsule. The mean particle size of the microcapsules can be determined by measuring the particle size of a representative sample with a laser light scattering particle size analyzer known to those skilled in the art. One example of a particle size analyzer is a Coulter LS Particle Size Analyzer.

Further in accordance with the methods described in U.S. Publication No. 2010/0248963, encapsulated acetanilides may be prepared wherein the particles (i.e., capsule or microcapsules) are characterized as having a mean particle size of at least about 7 µm. Particles of the microencapsulated acetanilide can be characterized as having a mean particle size of at least about 8 µm, at least about 9 µm, or at least about 10 µm. In various embodiments, the particles of the encapsulated acetanilide are characterized as having a mean particle size that is less than about 15 µm or less than 12 µm. In view thereof, the microencapsulated acetanilide can be characterized as having a mean particle size of from about 7 µm to about 15 µm, from about 7 µm to about 12 µm, from about 8 µm to about 12 µm, or from about 9 µm to about 12 µm. In particularly preferred embodiments, the range varies from about 9 µm to about 11 µm.

In certain embodiments, the core material may further comprise one or more compounds for release (e.g., an acetanilide and one or more additives compatible therewith which act to enhance its bioefficacy on weeds and/or reduce crop injury). For example, in some embodiments, the core material optionally comprises a safener. Suitable safeners include, for example, furilazole ((RS)-3-(dichloroacetyl)-5-(2-furanyl)-2,2-dimethyl-1,3-oxazolidine 95%), commercially available from Monsanto Company; AD 67 (4-(dichloroacetyl)-1-oxa-4-azaspiro[4,5]decane); benoxacor (CGA 154281, (RS)-4-dichloroacetyl-3,4-dihydro-3-methyl-2H-1,4-benzoxazine); cloquintocet-mexyl (CGA 184927, (5-chloroquinolin-8-yloxy)acetic acid); cyometrinil (CGA 43089, (Z)-cyanomethoxyimino(phenyl)acetonitrile); cyprosulfamide (N[4-(cyclopropylcarbamoyl)phenylsulfonyl]-o-anisamide); dichlormid (DDCA, 825788, N,N-diallyl-2,2-dichloroacetamide); dicyclonon ((RS)-1-dichloroacetyl-3,3,8a-trimethylperhydropyrrolo[1,2-a]pyrimidin-6-one); dietholate (O,O-diethyl O-phenyl phosphorothioate) fenchlorazole-ethyl (HOE 70542, 1-(2,4-dichlorophenyl)-5-trichloromethyl-1H-1,2,4-triazole-3-carboxylic acid); fenclorim (CGA 123407 4,6-dichloro-2-phenylpyrimidine); flurazole (benzyl 2-chloro-4-trifluoromethyl-1,3-thiazole-5-carboxylate); fluxofenim (CGA 133205, 4'-chloro-2,2,2-trifluoroacetophenone (EZ)-O-1,3-dioxolan-2-ylmethyloxime); isoxadifen (4,5-dihydro-5,5-diphenyl-1,2-oxazole-3-carboxylic acid); mefenpyr ((RS)-1-(2,4-dichlorophenyl)-5-methyl-2-pyrazoline-3,5-dicarboxylic acid); mephenate (4-chlorophenyl methylcarbamate); MG 191; naphthalic anhydride; oxabetrinil (CGA 92194, and (Z)-1,3-dioxolan-2-ylmethoxyimino(phenyl)acetonitrile).

In general, the encapsulated acetanilide herbicide particles comprise a water-immiscible, agricultural chemical-containing core material encapsulated by a polyurea shell wall, which is preferably substantially non-microporous, such that core material release occurs by a molecular diffusion mechanism, as opposed to a flow mechanism through a pore or rift in the polyurea shell wall. As noted herein, the shell wall may preferably comprise a polyurea product of a polymerization of one or more polyisocyanates and a principal polyamine (and optional auxiliary polyamine). Typically, the encapsulated acetanilide herbicide particles (e.g, capsules or microcapsules) are dispersed in a liquid medium, preferably water. The acetanilide herbicide loading of the encapsulated acetanilide herbicide dispersion is typically from about 5% to about 50% by weight on an active ingredient basis, such as 5%, 10%, 15%, 20%, 25%, 30%, 35%, 40%, 45% or even 50% by weight on an active ingredient basis. The aqueous herbicidal concentrate is prepared by combining the aqueous dispersion of encapsulated acetanilide herbicide particles and PPO inhibitor component.

The water-soluble PPO inhibitor component may be prepared by adding the acid herbicide (e.g., fomesafen) to water and then adding an appropriate base (e.g., sodium hydroxide) with agitation to prepare a solution of the water-soluble PPO inhibitor salt. The resulting solution is then mixed with the encapsulated acetanilide herbicide dispersion to form the aqueous herbicidal concentrate composition.

The encapsulated acetanilide herbicide dispersion and the aqueous herbicidal concentrate compositions of the present invention may contain one or more additives. For example, in various embodiments, the acetanilide herbicide dispersion and/or the aqueous herbicidal concentrate compositions comprise one or more of the following additives: dispersant(s), surfactant(s), thickener(s), structure-breaking agent(s), density adjusting agent(s), antifreeze agent(s), antipacking agent(s), drift control agent(s), preservative(s), and antifoam agent(s).

In various aspects, the encapsulated acetanilide herbicide dispersion and, consequently, the aqueous herbicidal concentrate compositions of the present invention comprise one or more thickeners. In general, thickeners are useful in retarding the settling process by increasing the viscosity of the aqueous phase. In various embodiments, pseudoplastic thickeners (i.e., shear-thinning thickeners) are preferred, because they reduce dispersion viscosity during pumping, which facilitates the economical application and even coverage of the dispersion to an agricultural field using the equipment commonly employed for such purpose. A few examples of useful pseudoplastic thickeners include water-soluble, guar- or xanthan-based gums (e.g. Kelzan from CPKelco), cellulose ethers (e.g. ETHOCEL from Dow), and modified cellulosics and polymers (e.g. Aqualon thickeners from Hercules). In some embodiments, the pseudoplastic thickener comprises a water-soluble gum selected from the group consisting of guar gum, xanthan gum, and a combination thereof. In certain embodiments, the pseudoplastic thickener comprises xanthan gum.

Some dispersions of encapsulated acetanilide herbicide known in the art contain no more than about 500 ppm or about 600 ppm of thickener. Beyond this concentration range the viscosity of the dispersion increases to a point which may result in poor pumpability and possible gelling of the encapsulated acetanilide herbicide particles. However, contrary to this understanding, it has been surprisingly discovered that when formulating an aqueous herbicidal concentrate containing encapsulated acetanilide herbicide (e.g., microcapsules) and a PPO inhibitor (e.g., water-soluble PPO), the thickener concentration exceeds this critical maximum by a significant amount in order to provide a stable composition (i.e. a composition of sufficiently high viscosity without significant phase separation). Accordingly, in various embodiments, the aqueous herbicidal concentrate compositions comprise at least about 750 ppm, at least about 800 ppm, at least about 850 ppm, at least about 900 ppm, or at least about 950 ppm of a thickener (e.g., pseudoplastic thickener) based on the total weight of the composition. Usually, the concentration of the thickener is less than about 2000 ppm, less than about 1800 ppm, less than about 1500 ppm, less than about 1300 ppm, or less than about 1200 ppm. In some embodiments, the concentration of the thickener is from about 800 ppm to about 1500 ppm or from about 900 ppm to about 1200 ppm.

In certain embodiments, the viscosity of the dispersion of encapsulated acetanilide herbicide upon formulation may preferably range from about 100 cps to about 600 cps, as tested with a Haake Rotovisco Viscometer and measured at about 10° C. by a spindle rotating at about 45 rpm. More preferably, the viscosity may range from about 100 cps to about 300 cps.

Dispersants are useful to inhibit the agglomeration and settling of the microcapsules and are present during the interfacial polymerization reaction used in preparation of the acetanilide microcapsules. Accordingly, in various embodiments, the encapsulated acetanilide herbicide dispersion and, consequently, the aqueous herbicidal concentrate compositions of the present invention comprise one or more dispersants. Low molecular weight dispersants may solubilize acetanilide capsule or microcapsule shell walls, particularly in the early stages of their formation, causing gelling problems. Thus, in some embodiments, the dispersants have relatively high molecular weights of at least about 1.5 kg/mole, more preferably of at least about 3 kg/mole, and still more preferably at least about 5, 10 or even 15 kg/mole. In some embodiments, the molecular weight may range from about 5 kg/mole to about 50 kg/mole. Dispersants may also be non-ionic or anionic. An example of a high molecular weight, anionic polymeric dispersant is polymeric naphthalene sulfonate sodium salt, such as Invalon (formerly Irgasol, Huntsman Chemicals). Other useful dispersants as previously mentioned include gelatin, casein, ammonium caseinate, polyvinyl alcohol, alkylated polyvinyl pyrrolidone polymers, maleic anhydride-methyl vinyl ether copolymers, styrene-maleic anhydride copolymers, maleic acid-butadiene and diisobutylene copolymers, sodium and calcium lignosulfonates, sulfonated naphthalene-formaldehyde condensates, modified starches, and modified cellulosics like hydroxyethyl or hydroxypropyl cellulose, and sodium carboxy methyl cellulose.

It has been found that adjusting the dispersant concentration is important to achieving a stable concentrate. Surprisingly, it was observed that when a stable dispersion of encapsulated acetanilide herbicide is mixed with an aqueous concentrate of PPO inhibitor, the resulting mixture was unstable with phase separation occurring. Thus, simply mixing commercial encapsulated acetanilide concentrates and PPO inhibitor concentrates are not expected to provide stable concentrate mixtures. Some stable formulations of encapsulated acetanilide herbicides are known to contain about 3 wt. % of total dispersant. Instead, in accordance with the invention, to provide stable aqueous herbicidal concentrate compositions, the total dispersant concentration is increased to at least about 3.5 wt. % or at least about 3.75 wt. % (e.g., from about 3.5 wt. % to about 5 wt. % or from about 3.75 wt. % to about 4.5 wt. %).

In order to enhance shelf stability and prevent gelling of the aqueous encapsulated acetanilide herbicide particles, particularly upon storage in high temperature environments, the liquid dispersions and, consequently, the aqueous herbicidal concentrate compositions preferably include a structure-breaking agent. Gelling is a significant concern for some encapsulated acetanilide herbicide dispersion because the process is difficult, if not impossible to reverse and can render the product unsuitable for dilution and application. Accordingly, in various embodiments, the encapsulated acetanilide herbicide dispersion and, consequently, aqueous herbicidal concentrate compositions of the present invention comprise one or more structure-breaking agents. One preferred structure-breaking agent is urea. To prevent gelling, in some embodiments, concentrate compositions include at least about 4, 5, or 6 wt. %, and up to about 20 wt. % or up to about 10 wt. % (e.g., about 4 wt. % to about 10 wt. %) of the structure-breaking agent. However, in some embodiments, it has been surprisingly discovered that when formulating certain aqueous herbicidal concentrates of the present invention containing encapsulated acetanilide herbicide (e.g., microcapsules) and a PPO inhibitor (e.g., water-soluble PPO), the concentration of structure-breaking agent is no more than about 3.5 wt. %. Typically, at least about 1 wt. %, at least about 2 wt. %, or at least about 2.5 wt. % of the structure-breaking agent is needed in these and other embodiments.

Adjusting the density of the aqueous phase to approach the mean weight per volume of the microcapsules also slows down the settling process. In addition to their primary purpose, many additives may increase the density of the aqueous phase. Further increase may be achieved by the addition of density adjusting agents such as sodium chloride and glycols. A preferred density adjusting agent is glycerin. The aqueous herbicidal concentrate compositions can have a concentration of density adjusting agent that is from at least about 4 wt. %, but no more than about 10 wt. %. In various embodiments, the concentration of density adjusting agent is from about 5 wt. % to about 10 wt. %, from about 5 wt. % to about 8 wt. %, from about 5 wt. % to about 6.5 wt. %, from about 5.5 wt. % to about 7 wt. %, or from about 5.5 wt. % to about 6.5 wt. %.

In addition to its structure-breaking properties, urea also functions as a density adjusting agent. In embodiments where urea is included as a structure-breaking agent, the total concentration of urea and density adjusting agent other than urea (e.g., glycerin) is from about 6 wt. % to about 10 wt. %, from about 6.5 wt. % to about 10 wt. %, from about 7 wt. % to about 10 wt. %, from about 7.5 wt. % to about 9 wt. %, or from about 8 wt. % to about 9 wt. %. In these embodiments, it has been found that this combination of urea and density adjusting agent (e.g., glycerin) provides a stable aqueous herbicidal concentrate composition that is resistant to gelling and settling upon storage even though the concentrations of these components are generally less than what is typically required to prepare a stable dispersion of encapsulated acetanilide herbicide.

In some instances, the weight to volume ratio of encapsulated acetanilide herbicide particles of preferred dimensions is approximated by the density of the core material, where the density of the core material is from about 1.05 to about 1.5 g/cm$^3$. Accordingly, in various embodiments, the density of the concentrate aqueous phase is formulated to within about 0.2 g/cm$^3$ of the mean weight to volume ratio of the encapsulated acetanilide herbicide particles.

Surfactants can optionally be included in the aqueous herbicidal concentrate composition. Suitable surfactants are selected from non-ionics, cationics, anionics and mixtures thereof. Examples of surfactants suitable for the practice of the present invention include, but are not limited to: alkoxylated tertiary etheramines (such as TOMAH E-Series surfactants); alkoxylated quaternary etheramine (such as TOMAH Q-Series surfactant); alkoxylated etheramine oxides (such as TOMAH AO-Series surfactant); alkoxylated tertiary amine oxides (such as AROMOX series surfactants); alkoxylated tertiary amine surfactants (such as the ETHOMEEN T and C series surfactants); alkoxylated quaternary amines (such as the ETHOQUAD T and C series surfactants); alkyl sulfates, alkyl ether sulfates and alkyl aryl ether sulfates (such as the WITCOLATE series surfactants); alkyl sulfonates, alkyl ether sulfonates and alkyl aryl ether sulfonates (such as the WITCONATE series surfactants); alkoxylated phosphate esters and diesters (such as the PHOSPHOLAN series surfactants); alkyl polysaccharides (such as the AGRIMUL PG series surfactants); alkoxylated alcohols (such as the BRIJ or HETOXOL series surfactants); and mixtures thereof.

Anti-packing agents facilitate redispersion of encapsulated acetanilide herbicide particles (e.g., microcapsules) upon agitation of a formulation in which the particles have settled. A microcrystalline cellulose material such as LATTICE from FMC is effective as an anti-packing agent. Other suitable anti-packing agents are, for example, clay, silicon dioxide, insoluble starch particles, and insoluble metal oxides (e.g. aluminum oxide or iron oxide). Anti-packing agents that change the pH of the dispersion are preferably avoided in at least some embodiments.

The pH of the aqueous herbicidal concentrate composition can range from about 7 to about 9, in order to minimize eye irritation of those persons who may come into contact with the composition in the course of handling or application to crops. However, if components of a formulated dispersion are sensitive to pH, buffers such as disodium phosphate may be used to hold the pH in a range within which the components are most effective. Additionally, a pH buffer such as citric acid monohydrate may be particularly useful in some systems during the preparation of encapsulated acetanilide herbicide, to maximize the effectiveness of a protective colloid such as SOKALAN CP9.

Other useful additives include, for example, biocides or preservatives (e.g., PROXEL, commercially available from Avecia), antifreeze agents, and antifoam agents (such as Antifoam SE23 from Wacker Silicones Corp. or AGNIQUE DFM-111S available from BASF).

The aqueous herbicidal concentrate compositions of the present invention can comprise a combination of additives. For example, in various embodiments, the aqueous herbicidal concentrate compositions comprise a combination of additives including a pseudoplastic thickener (e.g, xanthan gum), urea, glycerin, and a combination of dispersants (e.g., a naphthalene sulfonate condensate, a maleic acid-olefin copolymer and ammonium caseinate). In certain embodiments, the aqueous herbicidal concentrate compositions comprise a combination of additives including those listed in the table below with approximate concentration ranges:

| Ingredient | Concentration Range |
| --- | --- |
| pseudoplastic thickener (e.g., xanthan gum) | 800-1500 ppm |
| Urea | 2-3.5 wt. % |
| Glycerin | 5.5-7 wt. % |
| Naphthalene sulfonate condensate (e.g., INVALON DAM), Maleic acid-olefin copolymer (e.g., SOKALAN CP9), Ammonium caseinate | 3.75-4.5 wt. % (Total combined concentration) |

In preparation of an aqueous herbicidal concentrate composition comprising one or more of the additives mentioned herein, the entire portion of the additive (e.g., thickener, dispersant, structure-breaking agent, density adjusting agent, etc.) may be added to the liquid dispersion of encapsulated acetanilide herbicide prior to combining with PPO inhibitor component. Alternatively, a first portion of additive may be added during preparation of a stable liquid dispersion of encapsulated acetanilide herbicide and a second portion may be added during preparation of the aqueous herbicidal concentrate composition (i.e., mixing of the dispersion of encapsulated acetanilide herbicide and PPO inhibitor or solution thereof).

In accordance with the present invention, it has been observed that the readily extractable acetanilide herbicide in the aqueous phase of the concentrate compositions can be from about 0.5% to about 10%, from about 0.5% to about 5%, from about 0.5% to about 2%, from about 0.75% to about 10%, from about 0.75% to about 5%, from about 0.75% to about 2%, from about 1% to about 10%, from about 1% to about 5%, or from about 1% to about 2% by weight of the total acetanilide herbicide. Typically, the concentration of readily extractable acetanilide herbicide in microencapsulated concentrates is much less than 0.5 by weight of the total acetanilide herbicide. Without being bound by theory, it is believed that the PPO inhibitor present in the aqueous phase increases the solubility of acetanilide herbicide (See Example 7) and results in a higher concentration of readily extractable acetanilide herbicide. Readily extractable acetanilide can be determined by extracting the concentrate composition with weak solvent such as an aliphatic hydrocarbon solvent and analyzing the extract. Importantly, it has been found that crop safety and weed control efficacy are not adversely affected by this unexpected result.

Accordingly, another aspect of the present invention is directed to an aqueous herbicidal concentrate composition comprising microcapsules comprising a core material comprising an acetanilide herbicide and a shell wall material encapsulating the core material; an aqueous phase comprising the acetanilide herbicide (unencapsulated acetanilide) and a water-soluble protoporphyrinogen oxidase inhibitor (PPO inhibitor), wherein the total acetanilide herbicide concentration is at least about 25 wt. % and the concentration of the acetanilide herbicide in the aqueous phase is from about 0.5% to about 10%, from about 0.5% to about 5%, from about 0.5% to about 2%, from about 0.75% to about 10%, from about 0.75% to about 5%, from about 0.75% to about 2%, from about 1% to about 10%, from about 1% to about 5%, or from about 1% to about 2% by weight of the total acetanilide herbicide. As noted, the weight ratio of total acetanilide herbicide to PPO inhibitor on an acid equivalence (a.e.) basis can be from about 1:10 to about 10:1, from about 1:8 to about 8:1, from about 1:6 to about 6:1. In various embodiments, the weight of the acetanilide herbicide is greater than the weight of the PPO inhibitor. Thus, the weight ratio of total acetanilide herbicide to PPO inhibitor on an acid equivalence basis can be from about 2:1 to about 10:1, from about 2:1 to about 8:1, from about 3:1 to about 10:1, from about 3:1 to about 8:1, from about 4:1 to about 10:1, from about 4:1 to about 8:1, from about 5:1 to about 10:1, or from about 5:1 to about 8:1.

The aqueous herbicidal concentrates disclosed herein are useful as controlled-release herbicides. Therefore, the present invention is also directed to a method of applying an application mixture, which is a dilution of the concentrate composition, for controlling plant growth. The acetanilide herbicide loading in the application mixture is typically no more than about 5% by weight or from about 0.1% to about 5% by weight on an active ingredient basis, such as 5%, 4%, 3%, 2%, 1%, 0.5% or 0.1% by weight on an active ingredient basis.

The application mixture may be applied to a field according to practices known to those skilled in the art. In some embodiments, the application mixture is applied to the soil, before planting the crop plants or after planting, but pre-emergent to the crop plants. Because the release characteristics of encapsulated acetanilide herbicide particles are adjustable, the timing of release initiation (or increase release) can be controlled thereby giving both commercially acceptable weed control and a commercially acceptable rate of crop injury.

The effective amount of encapsulated acetanilide herbicide and PPO inhibitor to be applied to an agricultural field is dependent upon the identity of the herbicides, the release rate of the capsules or microcapsules, the crop to be treated, and environmental conditions, especially soil type and moisture. Generally, application rates of acetanilide herbicides, such as, for example, acetochlor, are on the order of about 0.1, 0.5, 1, 2, 3, 4, 5, 6, 7, 8, 9 or 10 kilograms of herbicide per hectare, or ranges thereof, such as from 0.5 to 10 kilograms per hectare, from 0.5 to 10 kilograms per hectare, from 0.5 to 5 kilograms per hectare, or from 1 to 5 kilograms per hectare. In some embodiments, an application rate for sorghum, rice and wheat of from about 0.85 to about 1 kilograms per hectare is preferred.

Generally, application rates of PPO inhibitors herbicides, such as, for example, sodium fomesafen, are on the order of about 0.05, 0.1, 0.5, 1, 1.5, 2, 2.5, 3, 4 or 5 kilograms of herbicide per hectare, or ranges thereof, such as from 0.1 to 5 kilograms per hectare, from 0.5 to 2.5 kilograms per hectare, or from 0.5 to 2 kilograms per hectare.

Application mixtures of the aqueous herbicidal concentrates are preferably applied to an agricultural field within a selected timeframe of crop plant development. In various embodiments of the present invention, the application mixture prepared from an aqueous herbicidal concentrate is applied post-emergence to crop plants. For purposes of the present invention, post-emergence to crop plants includes initial emergence from the soil, i.e., "at cracking". In some embodiments, the application mixture is applied to a field from 1-40 days prior to planting of the crop plant and/or pre-emergence (i.e., from planting of the crop plant up to, but not including, emergence or cracking) in order to provide control of newly emerging monocots and small seeded dicot species without significant crop damage. In various embodiments, the application mixture prepared from an aqueous herbicidal concentrate of the present invention is applied pre-emergence to weeds.

Application mixtures of the aqueous herbicidal concentrates of the present invention are useful for controlling a wide variety of weeds, i.e., plants that are considered to be a nuisance or a competitor of commercially important crop plants, such as corn, soybean, cotton, dry beans, snap beans, potatoes, etc. In some embodiments, the application mixtures are applied before the weeds emerge (i.e., pre-emergence application). Examples of weeds that may be controlled according to the method of the present invention include, but are not limited to, Meadow Foxtail (*Alopecurus pratensis*) and other weed species with the *Alopecurus* genus, Common Barnyard Grass (*Echinochloa crus-galli*) and other weed species within the *Echinochloa* genus, crabgrasses within the genus *Digitaria*, White Clover (*Trifolium repens*), Lambsquarters (*Chenopodium berlandieri*), Redroot Pigweed (*Amaranthus retroflexus*) and other weed species within the *Amaranthus* genus, Common Purslane (*Portulaca oleracea*) and other weed species in the *Portulaca* genus, *Chenopodium album* and other *Chenopodium* spp., *Setaria lutescens* and other *Setaria* spp., *Solanum nigrum* and other *Solanum* spp., *Lolium multiflorum* and other *Lolium* spp., *Brachiaria platyphylla* and other *Brachiaria* spp., *Sorghum halepense* and other *Sorghum* spp., *Conyza Canadensis* and other *Conyza* spp., and *Eleusine indica*. In some embodiments, the weeds comprise one or more glyphosate-resistant species, 2,4-D-resistant species, dicamba-resistant species and/or ALS inhibitor herbicide-resistant species. In some embodiments, the glyphosate-resistant weed species is selected from the group consisting of *Amaranthus palmeri, Amaranthus rudis, Ambrosia artemisiifolia, Ambrosia trifida, Conyza bonariensis, Conyza canadensis, Digitaria insularis, Echinochloa colona, Eleusine indica, Euphorbia heterophylla, Lolium multiflorum, Lolium rigidum, Plantago lancelata, Sorghum halepense,* and *Urochloa panicoides*.

Certain crop plants such as soybean and cotton are less susceptible to the action of acetanilide herbicides and PPO inhibitors than are weeds. In accordance with the present invention and based on experimental evidence to date, it is believed that the controlled acetanilide release rate from the encapsulated acetanilide herbicides in combination with crop plants having reduced acetanilide susceptibility enables commercial control of weeds and commercially acceptable rates of crop damage when encapsulated acetanilide herbicides are applied to a field either pre-planting or pre-emergent to the crop plant. This enables the use of seedling growth inhibitor acetanilide herbicides, or optionally seedling growth inhibitor acetanilide herbicides in combination with a PPO inhibitor, in crop plant pre-planting and pre-emergence applications.

In some embodiments of the present invention, crop plants include, for example, corn, soybean, cotton, dry beans, snap beans, and potatoes. Crop plants include hybrids, inbreds, and transgenic or genetically modified plants having specific traits or combinations of traits including, without limitation, herbicide tolerance (e.g., resistance to glyphosate, glufosinate, dicamba, sethoxydim, PPO inhibitor, etc.), *Bacillus thuringiensis* (Bt), high oil, high lysine, high starch, nutritional density, and drought resistance. In some embodiments, the crop plants are tolerant to organophosphorus herbicides, acetolactate synthase (ALS) or acetohydroxy acid synthase (AHAS) inhibitor herbicides, synthetic auxin herbicides and/or acetyl CoA carboxylase (ACCase) inhibitor herbicides, In other embodiments the crop plants are tolerant to glyphosate, dicamba, 2,4-D, MCPA, quizalofop, glufosinate and/or diclofop-methyl. In other embodiments, the crop plant is glyphosate and/or dicamba tolerant. In some embodiments of the present invention, crop plants are glyphosate and/or glufosinate tolerant. In some other embodiments, the crop plants are glyphosate, glufosinate and dicamba tolerant. In these and other embodiments, the crop plants are tolerant to PPO inhibitors.

Particularly preferred crop species are cotton and soybean. In embodiments where the crop is cotton, it is preferred to apply the application mixture at planting to before crop emergence, before planting of the crop (e.g., 1-4 weeks before planting crop), and/or after the crop has emerged (e.g., using a shielded sprayer to keep application mixture off of the crop). In embodiments where the crop is soybean, it is preferred to apply the application mixture at planting to before crop emergence, before planting of the crop (e.g., 1-4 weeks before planting crop), and/or after the crop has emerged.

EXAMPLES

The following non-limiting examples are provided to further illustrate the present invention.

Example 1

An aqueous herbicidal concentrate composition was prepared according to the protocol described in this example.

A dispersion of microencapsulated acetochlor was prepared as follows. The internal phase was prepared with the components and amounts shown in Table 1-1. The percentages indicate the approximate weight percentage of each component in the final aqueous herbicide concentrate composition.

TABLE 1-1

Internal Phase Components

| Ingredient | wt. % active | wt. % in final concentrate composition | wt. % active in final concentrate composition |
|---|---|---|---|
| Acetochlor | 95.80 | 31.57 | 30.24 |
| ISOPAR M (solvent, $C_{11}$-$C_{16}$ isoalkanes) | 100 | 1.63 | 1.63 |
| DESMODUR N 3215 (aliphatic isocyanate based on hexamethylene diisocyanate) | 100 | 2.3 | 2.3 |

To prepare the internal phase of the acetochlor microcapsules, acetochlor was charged to a mixing vessel. Next, the solvent ISOPAR M was charged to the mixing vessel, followed by the DESMODUR N 3215 polyisocyanate. The solution was agitated to obtain a clear homogenous solution. The solution may be sealed within the mixing vessel and stored until needed. Prior to use, the mixture was heated to 50° C. in an oven.

The external aqueous phase was prepared containing the components and amounts shown in Table 1-2:

TABLE 1-2

External Phase Components

| Ingredient | wt. % active | wt. % in final concentrate composition | wt. % active in final concentrate composition |
|---|---|---|---|
| Glycerin | 100 | 2.42 | 2.42 |
| SOKALAN CP9 (maleic acid-olefin copolymer) | 25 | 3.11 | 0.78 |

TABLE 1-2-continued

External Phase Components

| Ingredient | wt. % active | wt. % in final concentrate composition | wt. % active in final concentrate composition |
|---|---|---|---|
| Ammonium Caseinate | 100 | 0.08 | 0.08 |
| Citric Acid | 50 | 0.22 | 0.11 |
| Water | 100 | 34.65 | 34.65 |
| triethylenetetramine (TETA) | 98 | 0.6 | 0.58 |

To prepare the external phase, a mixing vessel was charged with water and the remaining external phase component other than TETA. The solution was agitated to obtain a clear homogenous solution. The solution may be sealed within the mixing vessel and stored until needed. Prior to use, the mixture was heated to 50° C. in an oven.

The interfacial polymerization medium was prepared by first charging the external phase (without TETA) to a Waring blender cup that has been preheated to 50° C. The commercial Waring blender (Waring Products Division, Dynamics Corporation of America, New Hartford, Conn., Blender 700) was powered through a 0 to 120 volt variable autotransformer. The blender mix speed was varied by controlling power to the blender. The internal phase was added to the external phase over a 16 second interval and blending was continued to obtain an emulsion.

To initiate polymerization and encapsulation of the internal phase, TETA was added to the emulsion over a period of about 5 seconds. The blender speed is then reduced to a speed which just produces a vortex for approximately five to fifteen minutes. The emulsion was then transferred to a hot plate and stirred. The reaction vessel is covered and maintained at about 50° C. for approximately two hours which has been found is sufficient time for the isocyanate to react essentially completely.

The capsule slurry is then allowed to cool to close to room temperature. The components shown in Table 1-3 with the exception of the buffer are previously premixed with a high speed mixer (Waring Blender or Cowles Dissolver). The resulting stabilizer premix is then added to the capsule slurry to stabilize the dispersion of microcapsules. Finally, the buffer is added and the mixture is stirred for at least 15 minutes until visually homogeneous.

TABLE 1-3

Stabilizer Components

| Ingredient | wt. % active | wt. % in concentrate composition | wt. % active in concentrate composition |
|---|---|---|---|
| Glycerin | 100 | 4.04 | 4.04 |
| KELZAN CC (xanthan gum) | 100 | 0.096 | 0.096 |
| Urea | 50 | 4.5 | 2.25 |
| INVALON DAM (naphthalene sulfonate condensate) | 40 | 7.22 | 2.89 |
| AGNIQUE DFM-111S (silicone based defoamer) | 100 | 0.001 | 0.001 |
| PROXEL GXL (solution of 1,2-benzisothiazolin-3-one | 100 | 0.06 | 0.06 |
| Caustic | 20 | 0.02 | 0.004 |
| Disodium phosphate | 100 | 0.60 | 0.60 |

This dispersion of acetochlor microcapsules was prepared to have an excess molar equivalents ratio of amine molar equivalents to isocyanate molar equivalents and herbicide to shell wall component ratios. TETA has an approximate equivalent weight of 36.6 g/mol. DESMODUR N 3215 has an approximate equivalent weight of 181 g/mol. The mean particle size of the acetochlor microcapsules was approximately 10 microns.

The dispersion of acetochlor microcapsules was mixed with a solution of sodium fomesafen. A stable concentrate without phase separation was formed. The complete aqueous concentrate composition is provided below.

TABLE 1-4

Final Aqueous Herbicidal Concentrate Composition 1

| Ingredient | wt. % active | wt. % in concentrate composition | wt. % active in concentrate composition |
|---|---|---|---|
| Acetochlor | 95.80 | 31.57 | 30.24 |
| Sodium Fomesafen | 97.70 | 6.88 | 6.72 |
| ISOPAR M (solvent, $C_{11}$-$C_{16}$ isoalkanes) | 100 | 1.63 | 1.63 |
| DESMODUR N 3215 (aliphatic isocyanate based on hexamethylene diisocyanate) | 100 | 2.3 | 2.3 |
| Glycerin | 100 | 6.46 | 6.46 |
| SOKALAN CP9 | 25 | 3.11 | 0.78 |
| Ammonium Caseinate | 100 | 0.08 | 0.08 |
| Citric Acid | 50 | 0.22 | 0.11 |
| Water | 100 | 34.65 | 34.65 |
| triethylenetetramine (TETA) | 98 | 0.6 | 0.58 |
| KELZAN CC (xanthan gum) | 100 | 0.096 | 0.096 |
| Urea | 50 | 4.5 | 2.25 |
| INVALON DAM (naphthalene sulfonate condensate) | 40 | 7.22 | 2.89 |
| AGNIQUE DFM-111S (silicone based defoamer) | 100 | 0.001 | 0.001 |
| PROXEL GXL (solution of 1,2-benzisothiazolin-3-one | 100 | 0.06 | 0.06 |
| Caustic | 20 | 0.02 | 0.004 |
| Disodium phosphate | 100 | 0.60 | 0.60 |

Example 2

Additional aqueous herbicidal concentration compositions were prepared according to the protocol described in this Example 1. The composition of each aqueous concentrate is provided in the tables below.

TABLE 2-1

Final Aqueous Herbicidal Concentrate Composition 2
Concentrate No. 2

| Ingredient | wt. % active | wt. % in concentrate composition | wt. % active in concentrate composition |
|---|---|---|---|
| Acetochlor | 95.8 | 31.57 | 30.24 |
| Fomesafen | 98 | 6.86 | 6.72 |
| Isopar M | 100 | 1.63 | 1.63 |
| Desmodur N 3215 | 100 | 2.30 | 2.30 |
| TETA | 98 | 0.60 | 0.58 |
| Glycerin | 100 | 6.63 | 6.63 |
| Sokalan CP9 (25%) | 25 | 3.11 | 0.78 |

TABLE 2-1-continued

Final Aqueous Herbicidal Concentrate Composition 2
Concentrate No. 2

| Ingredient | wt. % active | wt. % in concentrate composition | wt. % active in concentrate composition |
|---|---|---|---|
| Ammonium Caseinate | 100 | 0.06 | 0.06 |
| Citric Acid (50%) | 50 | 0.22 | 0.11 |
| Kelzan CC | 100 | 0.096 | 0.096 |
| Urea | 50 | 4.50 | 2.25 |
| Invalon DAM | 40 | 7.22 | 2.89 |
| Agnique DFM-111S | 100 | 0.001 | 0.001 |
| Proxel GXL | 100 | 0.06 | 0.06 |
| Caustic (20%) | 20 | 3.06 | 0.61 |
| Disodium Phosphate | 100 | 0.60 | 0.60 |
| Water | 100 | 34.51 | |
| Total | | 100 | |

TABLE 2-2

Final Aqueous Herbicidal Concentrate Composition 3
Concentrate No. 3

| Ingredient | wt. % active | wt. % in concentrate composition | wt. % active in concentrate composition |
|---|---|---|---|
| Acetochlor | 95.8 | 31.57 | 30.24 |
| Fomesafen | 98 | 6.86 | 6.72 |
| Isopar M | 100 | 1.63 | 1.63 |
| Desmodur N 3215 | 100 | 2.30 | 2.30 |
| TETA | 98 | 1.17 | 0.58 |
| Glycerin | 100 | 6.46 | 6.46 |
| Sokalan CP9 (25%) | 25 | 3.11 | 0.78 |
| Ammonium Caseinate | 100 | 0.06 | 0.06 |
| Citric Acid (50%) | 50 | 0.22 | 0.11 |
| Kelzan CC | 100 | 0.096 | 0.096 |
| Urea | 50 | 4.50 | 2.25 |
| Invalon DAM | 40 | 7.22 | 2.89 |
| Agnique DFM-111S | 100 | 0.001 | 0.001 |
| Proxel GXL | 100 | 0.06 | 0.06 |
| Caustic (20%) | 20 | 3.06 | 0.61 |
| Disodium Phosphate | 100 | 0.60 | 0.60 |
| Water | 100 | 34.11 | |
| Total | | 100.00 | |

TABLE 2-3

Final Aqueous Herbicidal Concentrate Composition 4
Concentrate No. 4

| Ingredient | wt. % active | wt. % in concentrate composition | wt. % active in concentrate composition |
|---|---|---|---|
| Acetochlor | 95.8 | 31.57 | 30.24 |
| Fomesafen | 98 | 6.86 | 6.72 |
| Isopar M | 100 | 1.63 | 1.63 |
| Desmodur N 3215 | 100 | 2.30 | 2.30 |
| TETA | 98 | 1.17 | 0.58 |
| Glycerin | 100 | 6.30 | 6.30 |
| Sokalan CP9 (25%) | 25 | 3.11 | 0.78 |
| Ammonium Caseinate | 100 | 0.06 | 0.06 |
| Citric Acid (50%) | 50 | 0.22 | 0.11 |
| Kelzan CC | 100 | 0.096 | 0.096 |
| Urea | 50 | 4.50 | 2.25 |
| Invalon DAM | 40 | 7.22 | 2.89 |
| Agnique DFM-111S | 100 | 0.001 | 0.001 |
| Proxel GXL | 100 | 0.06 | 0.06 |
| Caustic (20%) | 20 | 3.06 | 0.61 |
| Disodium Phosphate | 100 | 0.60 | 0.60 |
| Water | 100 | 34.27 | |
| Total | | 100 | |

TABLE 2-4

Final Aqueous Herbicidal Concentrate Composition 5
Concentrate No. 5

| Ingredient | wt. % active | wt. % in concentrate composition | wt. % active in concentrate composition |
|---|---|---|---|
| Acetochlor | 95.8 | 31.57 | 30.24 |
| Fomesafen | 98 | 6.86 | 6.72 |
| Isopar M | 100 | 1.63 | 1.63 |
| Desmodur N 3215 | 100 | 2.30 | 2.30 |
| TETA | 98 | 0.60 | 0.58 |
| Glycerin | 100 | 6.46 | 6.46 |
| Sokalan CP9 (25%) | 25 | 3.11 | 0.78 |
| Ammonium Caseinate | 100 | 0.06 | 0.06 |
| Citric Acid (50%) | 50 | 0.22 | 0.11 |
| Kelzan CC | 100 | 0.119 | 0.119 |
| Urea | 50 | 4.50 | 2.25 |
| Invalon DAM | 40 | 7.22 | 2.89 |
| Agnique DFM-111S | 100 | 0.001 | 0.001 |
| Proxel GXL | 100 | 0.06 | 0.06 |
| Caustic (20%) | 20 | 3.06 | 0.61 |
| Disodium Phosphate | 100 | 0.60 | 0.60 |
| Water | 100 | 34.66 | |
| Total | | 100 | |

TABLE 2-5

Final Aqueous Herbicidal Concentrate Composition 6
Concentrate No. 6

| Ingredient | wt. % active | wt. % in concentrate composition | wt. % active in concentrate composition |
|---|---|---|---|
| Acetochlor | 95.8 | 31.57 | 30.24 |
| Fomesafen | 98 | 6.86 | 6.72 |
| Isopar M | 100 | 1.63 | 1.63 |
| Desmodur N 3215 | 100 | 2.30 | 2.30 |
| TETA | 98 | 0.60 | 0.58 |
| Glycerin | 100 | 2.38 | 2.38 |
| Sokalan CP9 (25%) | 25 | 3.11 | 0.78 |
| Ammonium Caseinate | 100 | 0.06 | 0.06 |
| Citric Acid (50%) | 50 | 0.22 | 0.11 |
| Kelzan CC | 100 | 0.096 | 0.096 |
| Urea | 50 | 8.58 | 4.29 |
| Invalon DAM | 40 | 7.22 | 2.89 |
| Agnique DFM-111S | 100 | 0.001 | 0.001 |
| Proxel GXL | 100 | 0.06 | 0.06 |

TABLE 2-5-continued

Final Aqueous Herbicidal Concentrate Composition 6
Concentrate No. 6

| Ingredient | wt. % active | wt. % in concentrate composition | wt. % active in concentrate composition |
|---|---|---|---|
| Caustic (20%) | 20 | 3.06 | 0.61 |
| Disodium Phosphate | 100 | 0.60 | 0.60 |
| Water | 100 | 34.68 | |
| Total | | 100 | |

TABLE 2-6

Final Aqueous Herbicidal Concentrate Composition 7
Concentrate No. 7

| Ingredient | wt. % active | wt. % in concentrate composition | wt. % active in concentrate composition |
|---|---|---|---|
| Acetochlor | 95.8 | 31.57 | 30.24 |
| Fomesafen | 98.5 | 6.82 | 6.72 |
| Isopar M | 100 | 1.63 | 1.63 |
| Desmodur N 3215 | 100 | 2.30 | 2.3 |
| TETA | 98 | 1.17 | 1.15 |
| Glycerin | 100 | 6.46 | 6.46 |
| Sokalan CP9 | 25 | 3.11 | 0.78 |
| Ammonium Caseinate | 100 | 0.08 | 0.08 |
| Citric Acid | 50 | 0.22 | 0.11 |
| Kelzan CC | 100 | 0.10 | 0.10 |
| Urea | 50 | 4.50 | 2.25 |
| Invalon DAM | 40 | 7.22 | 2.89 |
| Agnique DFM-111S | 100 | 0.001 | 0.001 |
| Proxel GXL | 100 | 0.06 | 0.06 |
| Caustic (20%) | 20 | 3.06 | 0.61 |
| Disodium Phosphate | 100 | 0.60 | 0.60 |
| Water | 100 | 31.09 | |
| Total | | 100 | |

TABLE 2-7

Final Aqueous Herbicidal Concentrate Composition 8
Concentrate No. 8

| Ingredient | wt. % active | wt. % in concentrate composition | wt. % active in concentrate composition |
|---|---|---|---|
| Acetochlor | 95.8 | 31.57 | 30.24 |
| Fomesafen | 98.5 | 5.46 | 5.38 |
| Isopar M | 100 | 1.63 | 1.63 |
| Desmodur N 3215 | 100 | 2.30 | 2.30 |
| TETA | 98 | 1.17 | 1.15 |
| Glycerin | 100 | 6.46 | 6.46 |
| Sokalan CP9 (25%) | 25 | 3.11 | 0.78 |
| Ammonium Caseinate | 100 | 0.08 | 0.08 |
| Citric Acid (50%) | 50 | 0.22 | 0.11 |
| Kelzan CC | 100 | 0.10 | 0.10 |
| Urea | 50 | 4.50 | 2.25 |
| Invalon DAM | 40 | 7.22 | 2.89 |
| Agnique DFM-111S | 100 | 0.001 | 0.001 |
| Proxel GXL | 100 | 0.06 | 0.06 |

TABLE 2-7-continued

Final Aqueous Herbicidal Concentrate Composition 8
Concentrate No. 8

| Ingredient | wt. % active | wt. % in concentrate composition | wt. % active in concentrate composition |
|---|---|---|---|
| Caustic (20%) | 20 | 0.02 | 0.004 |
| Disodium Phosphate | 100 | 2.45 | 0.49 |
| Water | 100 | 35.49 | |
| Total | | 100 | |

Example 3

Various properties of the aqueous herbicidal concentration composition prepared in Examples 1 and 2 were measured. The results of these measurements are provided in the table below. Readily extractable acetochlor was determined by extracting the concentrate composition with weak solvent such as an aliphatic hydrocarbon solvent and analyzing the extract. Particle size was measured with a Coulter LS Particle Size Analyzer. Viscosity was measured with a Haake Rotovisco Viscometer at about 10° C. with a spindle rotating at about 45 rpm.

TABLE 3-1

Properties of Herbicidal Concentrate Compositions

| Concentrate No. | Readily Extractable Acetochlor (wt. % of total acetochlor) | Particle Size (microns) | pH (neat) | Specific Gravity (at 20° C.) | HAAKE Viscosity (cP) |
|---|---|---|---|---|---|
| 1 | 0.512 | 9.3/9.3 | 9.1 | 1.1241 | 250 |
| 2 | 0.749 | 9.7/9.8 | 8.74 | 1.1228 | 250 |
| 3 | 0.644 | 10.1/10.1 | 8.93 | 1.1222 | 251 |
| 4 | 0.476 | 9.6/9.7 | 8.96 | 1.1217 | 233 |
| 5 | 0.462 | 9.9/9.9 | 9.1 | 1.123 | 268 |
| 6 | 0.385 | 9.3/9.2 | 9.1 | 1.1184 | 167 |
| 7 | Not measured | ~10 | 7.5 | 1.121 | 225 |
| 8 | Not measured | ~10 | 7.5 | 1.115 | 250 |

Example 4

The aqueous herbicidal concentration compositions prepared in Examples 1 and 2 were subjected to a heat aging test to investigate the effects of prolonged storage on the viscosity of the compositions. A sample of each herbicidal concentrate composition was stored at 40° C. for a period of 8 weeks. No gelling was observed in any of the concentrate compositions.

Example 5

WARRANT, a commercially available concentrate composition of microencapsulated acetochlor available from Monsanto Co., St. Louis, Mo., was mixed with a commercial concentrate composition of sodium fomesafen. The table below provides the composition of the mixture. Combining these two concentrate compositions yielded an unstable mixture with phase separation.

TABLE 5-1

Mixture of WARRANT and Fomesafen Concentrates

| Ingredient | wt. % active | wt. % in concentrate composition | wt. % active in concentrate composition |
|---|---|---|---|
| Acetochlor | 95.80 | 31.57 | 30.24 |
| Sodium Fomesafen | 97.70 | 6.88 | 6.78 |
| ISOPAR M (solvent, $C_{11}$-$C_{16}$ isoalkanes) | 100 | 1.63 | 1.63 |
| DESMODUR N 3215 (aliphatic isocyanate based on hexamethylene diisocyanate) | 100 | 2.3 | 2.3 |
| Glycerin | 100 | 7.19 | 7.19 |
| SOKALAN CP9 | 25 | 2.16 | 0.54 |
| Ammonium Caseinate | 100 | 0.04 | 0.04 |
| Citric Acid | 50 | 0.16 | 0.08 |
| Water | 100 | 33.30 | 33.30 |
| triethylenetetramine (TETA) | 98 | 0.6 | 0.58 |
| KELZAN CC (xanthan gum) | 100 | 0.05 | 0.05 |
| Urea | 50 | 8.28 | 4.14 |
| INVALON DAM (naphthalene sulfonate condensate) | 40 | 5.60 | 2.24 |
| AGNIQUE DFM-111S (silicone based defoamer) | 100 | 0.001 | 0.001 |
| PROXEL GXL (solution of 1,2-benzisothiazolin-3-one | 100 | 0.05 | 0.05 |
| Caustic | 20 | 0.02 | 0.004 |
| Disodium phosphate | 100 | 0.17 | 0.17 |

Example 6

A series of field trials were conducted at a variety of locations. The soil texture at these sites ranged from silty loam, silty clay loam, to sandy silt loam and sandy loam. The objective of the experiment was to evaluate the weed efficacy and length of residual efficacy of the each stand-alone herbicide compared to the herbicide combinations. The experiments were conducted in a randomized complete block design. Four replications were completed per treatment. Time of application was pre-emergence to weeds, and treatments were applied using a back-pack or tractor mounted sprayer. Application mixtures prepared from concentrate composition 7 described in Example 2 were applied under field conditions at an application rate of 1.363 lb of active ingredient (a.i.) per acre. For comparison, field trials with application mixtures of fomesafen and WARRANT were also performed.

Percent weed control by weed species was observed at four weeks after treatment (WAT). Weed control was determined as a percentage as compared to untreated plants following a standard procedure where visual assessment of plant mortality and growth reduction is made by one specially trained to make such assessments. Across the field trials, the results for 16 broadleaf and 7 narrowleaf weed species were recorded. These included ABUTH (velvetleaf) in 9 trials; AMATA/AMAPA (palmer amaranth/waterhemp), Glyphosate-resistant (GR) AMAPA/AMATA, IPOSS (*morningglory* sps.), and ECHCG (*Echinochola* sps.) in 5 trials; DIGSS (*Digitaria* sps.) in 4 trials; CASOB (sicklepod), CHEAL (common lambsquarters), and AMBEL (common ragweed) in 3 trials; POROL (common purslane) MOLVE (carpetweed), SETFA (giant foxtail), and SORHA (johnsongrass) in 2 trials; ACCOS (hophornbeam copperleaf), EPHSS (*Euphorbia* sps.), HIBTR (venice mallow), SIDSP (prickly sida), BRASS (*signalgrass* sps.), SORSS (*sorghum* sps.), and PESGL (pearl millet) in 1 trial. The results of the field trials are presented in Tables 6-1 and 6-2. Mean percent control and standard error are calculated by the least squares method. A summary of the results for a second field trial with similar weed species at four weeks after treatment is presented in Table 6-3.

TABLE 6-1

Control of Weed Species for Acetochlor, Fomesafen, and Concentrate No. 7 in Field Trial 1

| Weed type | Weed Species | WARRANT (acetochlor) 1.125 lb/acre | | Fomesafen 0.25 lb/acre | | Concentrate No. 7 1.363 lb/acre | |
|---|---|---|---|---|---|---|---|
| | | % Control (mean) | Standard Error | % Control (mean) | Standard Error | % Control (mean) | Standard Error |
| Broadleaf | ABUTH | 55.6 | 5.8 | 63.7 | 5.8 | 75.5 | 5.8 |
| | ACCOS | 80.0 | 1.0 | 93.8 | 1.0 | 92.5 | 1.0 |
| | AMAPA | 71.9 | 4.8 | 92.5 | 4.8 | 100.0 | 4.8 |
| | AMAPG | 80.5 | 7.8 | 87.8 | 7.8 | 96.6 | 7.8 |
| | AMATA | 78.3 | 8.2 | 85.8 | 8.2 | 91.7 | 8.2 |
| | AMATG | 47.5 | 7.1 | 57.5 | 7.1 | 68.8 | 7.1 |
| | AMBEL | 67.5 | 11.6 | 75.8 | 11.6 | 79.2 | 11.6 |
| | CASOB | 44.2 | 15.3 | 46.2 | 15.3 | 49.3 | 15.3 |
| | CHEAL | 54.6 | 11.8 | 78.3 | 11.8 | 70.8 | 11.8 |
| | EPHSS | 85.0 | 1.6 | 100.0 | 1.6 | 100.0 | 1.6 |
| | HIBTR | 70.0 | 5.0 | 75.0 | 5.0 | 85.0 | 5.0 |
| | IPOHE | 52.5 | 10.8 | 52.5 | 10.8 | 72.5 | 10.8 |
| | IPOLA | 35.0 | 4.0 | 27.5 | 4.0 | 35.0 | 4.0 |
| | IPOSS | 46.9 | 19.0 | 63.1 | 19.0 | 76.8 | 19.0 |
| | MOLVE | 87.1 | 4.1 | 90.6 | 4.1 | 96.5 | 4.1 |
| | POROL | 66.3 | 11.6 | 66.3 | 11.6 | 62.5 | 11.6 |
| | SEBEX | 27.5 | 8.3 | 33.8 | 8.3 | 55.0 | 8.3 |
| | SIDSP | 93.8 | 2.6 | 98.3 | 2.6 | 100.0 | 2.6 |
| Narrowleaf | BRASS | 97.5 | 3.1 | 99.5 | 3.1 | 96.0 | 3.1 |
| | DIGSA | 90.8 | 9.5 | 65.3 | 9.5 | 97.4 | 9.5 |
| | DIGSS | 96.3 | 2.8 | 99.0 | 2.8 | 100.0 | 2.8 |
| | ECHCF | 98.1 | 7.0 | 71.9 | 7.0 | 99.9 | 7.0 |
| | ECHCG | 89.5 | 12.0 | 66.8 | 12.0 | 96.0 | 12.0 |
| | PESGL | 52.5 | 2.2 | 100.0 | 2.2 | 100.0 | 2.2 |
| | SETFA | 72.5 | 15.6 | 58.8 | 15.6 | 72.5 | 15.6 |

TABLE 6-1-continued

Control of Weed Species for Acetochlor, Fomesafen, and Concentrate No. 7 in Field Trial 1

| Weed type | Weed Species | WARRANT (acetochlor) 1.125 lb/acre | | Fomesafen 0.25 lb/acre | | Concentrate No. 7 1.363 lb/acre | |
|---|---|---|---|---|---|---|---|
| | | % Control (mean) | Standard Error | % Control (mean) | Standard Error | % Control (mean) | Standard Error |
| | SORHA | 65.5 | 10.6 | 86.8 | 10.7 | 90.6 | 10.6 |
| | SORSS | 90.0 | 2.2 | 99.8 | 2.2 | 100.0 | 2.2 |

TABLE 6-2

Field Trial 1 Results Summary
Field Trial 1

| Active | Application Rate (lb a.i./acre) | Broadleaf Control | Narrowleaf Control |
|---|---|---|---|
| Fomesafen | 0.25 (0.28 kg/hectare) | 70 | 79 |
| WARRANT | 1.125 (1.26 kg/hectare) | 61 | 85 |
| Concentrate No. 7 (fomesafen + acetochlor) | 1.363 (1.53 kg/hectare) | 77 | 94 |

TABLE 6-2

Field Trial 2 Results Summary
Field Trial 2

| Active | Application Rate (lb a.i./acre) | Broadleaf Control | Narrowleaf Control |
|---|---|---|---|
| Fomesafen | 0.25 (0.28 kg/hectare) | 63.6 | 66.3 |
| WARRANT | 1.125 (1.26 kg/hectare) | 43.2 | 86.2 |
| Concentrate No. 7 (fomesafen + acetochlor) | 1.363 (1.53 kg/hectare) | 77 | 88.8 |

Example 7

In this Example, the effect of fomesafen on the solubility of acetochlor was measured at various fomesafen concentrations. The results are shown in Table 7-1.

TABLE 7-1

Solubility of Acetochlor in Fomesafen Solutions

| Fomesafen Solution Concentartion (wt. %) | Acetochlor Concentration in Solution (wt. %) |
|---|---|
| 0 | 0.04 |
| 10 | 0.45 |
| 20 | 1.36 |
| 30 | 1.91 |
| 40 | 1.94 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above compositions and methods without departing from the scope of the invention, it is intended that all matter contained in the above description shall be interpreted as illustrative and not in a limiting sense.

Having described the invention in detail, it will be apparent that modifications and variations are possible without departing from the scope of the invention defined in the appended claims.

What is claimed is:

1. An aqueous herbicidal concentrate composition comprising:
   acetochlor;
   fomesafen in the form of a water-soluble salt;
   a pseudoplastic thickener comprising a water-soluble gum selected from the group consisting of guar gum, xanthan gum, and a combination thereof in a concentration of from about 800 ppm to about 1500 ppm;
   wherein a first portion of the acetochlor is present in microcapsules comprising a core material comprising the first portion of the acetochlor and a shell wall material encapsulating the core material; and
   an aqueous phase comprising a second, unencapsulated portion of the acetochlor and the fomesafen;
   wherein the total acetochlor concentration in the composition on an active ingredient basis is at least 25 wt. %; the weight ratio of total acetochlor to fomesafen on an acid equivalence (a.e.) basis is from about 1:10 to 10:1; and the concentration of the second, unencapsulated portion of the acetochlor in the aqueous phase is from about 0.5% to about 10% of the total weight of acetochlor.

2. The aqueous herbicidal concentrate composition of claim 1 wherein the concentration of the pseudoplastic thickener is from about 900 ppm to about 1200 ppm.

3. The aqueous herbicidal concentrate composition of claim 1 wherein the composition further comprises a structure-breaking agent.

4. The aqueous herbicidal concentrate composition of claim 3 wherein the structure-breaking agent comprises urea.

5. The aqueous herbicidal concentrate composition of claim 1 further comprising a density adjusting agent.

6. The aqueous herbicidal concentrate composition of claim 5 wherein the density adjusting agent comprises glycerin.

7. The aqueous herbicidal concentrate composition of claim 1 wherein the concentration of the salt of fomesafen on an active ingredient basis is from about 2 wt. % to about 20 wt. %.

8. The aqueous herbicidal concentrate composition of claim 1 wherein the water-soluble salt of fomesafen comprises sodium fomesafen.

9. The aqueous herbicidal concentrate composition of claim 1 wherein the composition further comprises a structure-breaking agent and a density adjusting agent and the total concentration of the structure-breaking agent and the density adjusting agent is from about 7 wt. % to about 10 wt. %.

10. The aqueous herbicidal concentrate composition of claim 1 wherein the acetochlor concentration in the composition on an active ingredient basis is at least 30 wt. %.

11. The aqueous herbicidal concentrate composition of claim 1 wherein the acetochlor concentration in the composition on an active ingredient basis is from about 25 wt. % to about 40 wt. %.

12. The aqueous herbicidal concentrate composition of claim 1 wherein the weight of the acetochlor is greater than the weight of the salt of fomesafen on acid equivalence basis.

13. The aqueous herbicidal concentrate composition of claim 1 wherein the weight ratio of total acetochlor to the salt of fomesafen on an acid equivalence basis is from about 2:1 to about 10:1.

14. The aqueous herbicidal concentrate composition of claim 1 wherein the microcapsules have a mean particle size range of from about 2 μm to about 15 μm.

15. The aqueous herbicidal concentrate composition of claim 1 wherein the concentration of unencapsulated acetochlor in the aqueous phase is from about 0.5% to about 5% of the total weight of acetochlor.

16. The aqueous herbicidal concentrate composition of claim 1 wherein the microcapsules comprising the first portion of the acetochlor comprise a polyurea shell wall.

17. The aqueous herbicidal concentrate composition of claim 16 wherein the polyurea shell wall is formed in a polymerization medium by a polymerization reaction between a polyisocyanate component comprising a polyisocyanate or mixture of polyisocyanates and a polyamine component comprising a polyamine or mixture of polyamines to form the polyurea.

18. The aqueous herbicidal concentrate composition of claim 17 wherein the polyisocyanate component comprises an aliphatic polyisocyanate.

19. The aqueous herbicidal concentrate composition of claim 17 wherein the ratio of amine molar equivalents contained in the polyamine component to isocyanate molar equivalents contained in the polyisocyanate component is at least about 1.1:1.

20. The aqueous herbicidal concentrate composition of claim 17 wherein the ratio of amine molar equivalents contained in the polyamine component to isocyanate molar equivalents contained in the polyisocyanate component is from about 1.15:1 to about 1.7:1.

21. The aqueous herbicidal concentrate composition of claim 17 wherein the weight ratio of the first portion of the acetochlor to the shell wall is from about 13:1 to about 6:1.

* * * * *